United States Patent
Serratore et al.

(10) Patent No.: US 7,460,581 B2
(45) Date of Patent: Dec. 2, 2008

(54) METHOD FOR TRANSMITTING SIGNALS USING ANTENNA DIVERSITY, FOR INSTANCE IN MOBILE COMMUNICATION SYSTEMS, TRANSMITTER, RECEIVER AND COMPUTER PROGRAM PRODUCT THEREFOR

(75) Inventors: Alberto Serratore, Gravina di Catania (IT); Giuseppe Avellone, Palermo (IT); Francesco Rimi, Alcamo (IT); Nicolò Ivan Piazzese, Acireale (IT); Agostino Galluzzo, Palma di Montechiaro (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 492 days.

(21) Appl. No.: 10/910,955

(22) Filed: Aug. 3, 2004

(65) Prior Publication Data

US 2005/0271121 A1      Dec. 8, 2005

(30) Foreign Application Priority Data

Aug. 5, 2003   (EP)   ................................. 03425535

(51) Int. Cl.
    *H04B 1/707* (2006.01)
(52) U.S. Cl. ........................ 375/146; 375/148; 375/295; 375/299; 455/500
(58) Field of Classification Search ................. 375/146, 375/147, 148, 299, 347; 455/101, 132, 296; 370/335
See application file for complete search history.

(56) References Cited

U.S. PATENT DOCUMENTS

| | | | |
|---|---|---|---|
| 5,652,764 A * | 7/1997 | Kanzaki et al. | 375/130 |
| 6,188,736 B1 * | 2/2001 | Lo et al. | 375/347 |
| 6,510,173 B1 * | 1/2003 | Garmonov et al. | 375/141 |
| 2002/0075832 A1 * | 6/2002 | Kim et al. | 370/335 |
| 2004/0077378 A1 * | 4/2004 | Kim et al. | 455/562.1 |

FOREIGN PATENT DOCUMENTS

| | | |
|---|---|---|
| EP | 1 482 667 | 12/2004 |
| WO | WO 02/43313 A2 | 5/2002 |
| WO | WO 02/47278 A2 | 6/2002 |

* cited by examiner

*Primary Examiner*—David C. Payne
*Assistant Examiner*—Leon Flores
(74) *Attorney, Agent, or Firm*—Lisa K. Jorgenson; Dennis M. de Guzman; Seed IP Law Group PLLC

(57) ABSTRACT

Encoded digital symbols are transmitted via a first pair of antennas and at least one second pair of antennas. The sets of symbols used for the transmission via the second pair of antennas are re-ordered temporally into subsets of symbols with respect to the symbols used for the first pair of antennas. For the first pair of antennas, there is used a signal subjected to encoding with a code-division-multiple-access code and subjected to spreading with a spreading code, and, likewise, for the second pair or pairs of antennas there are used signals subjected to encoding with respective code-division-multiple-access code and subjected to spreading with a respective spreading code. At least one between the respective code-division-multiple-access code and the respective spreading code used for the transmission via the second pair of antennas is different from the code-division-multiple-access code and from the spreading code used for the transmission via the first pair of antennas. The solution can be extended to the use of a plurality of second pairs of antennas in transmission and/or to the use of a plurality of antennas in reception.

34 Claims, 2 Drawing Sheets

METHOD FOR TRANSMITTING SIGNALS USING ANTENNA DIVERSITY, FOR INSTANCE IN MOBILE COMMUNICATION SYSTEMS, TRANSMITTER, RECEIVER AND COMPUTER PROGRAM PRODUCT THEREFOR

BACKGROUND OF THE INVENTION

1. Field of the Invention

The present disclosure relates generally to techniques for signal transmission with antenna diversity and has been developed with particular but not exclusive attention paid to the possible application in the framework of telecommunications systems based upon the CDMA/3GPP (Code-division Multiple Access/Third Generation Partnership Project) standard in its various versions, for example.

Reference to this possible application must not, however, be interpreted as in any way limiting the scope of the invention.

2. Description of the Related Art

In order to increase the performance of the aforesaid telecommunication systems, there have been proposed various transmission schemes: in this connection, the 3GPP standard has defined both open-loop techniques, referred to, respectively, as STTD and TSTD, and closed-loop solutions, based upon beam-forming techniques.

In order to improve the performance of the system, the 3GPP standard contemplates the use of techniques based upon the use of two transmitting antennas set at the base stations (BTS) in combination with strategies for encoding the data transmitted by them.

Recourse to the principle of antenna diversity in transmission, and, in particular, to the approach referred to as space-time coding (STC) with a number of transmitting antennas greater than two and increasingly complex encodings, draw on the pioneering results reported by G. J. Foschini et al. in Bell Labs Tech. J., Autumn 1996, and in the works of Telatar, "Capacity of multiantenna Gaussian channels" AT&T Bell Labs, Tech. Rep., June 1995 and once again of Foschini and Gans in Wireless Personal Comm., March 1998.

The above studies have demonstrated that the spectral efficiency of a device can be considerably increased by adopting diversity techniques, not only in reception, but also in transmission. Space-time coding (STC) techniques are able to exploit the characteristics of multiple-reflection transmission environments to distinguish independent signaling transmitted simultaneously in the same frequency band. These techniques prove very effective in environments (such as, precisely, the environment of mobile communication networks), in which the main problem to be faced is that of multipath fading.

In particular, Space-Time Transmit Diversity (STTD) techniques, to which reference has already been made previously, is a type of space-time coding that enables improvement of the performance in terms of error probability by maintaining unvaried the transmission rate by means of a pair of antennas in transmission and a corresponding encoding of the data flow sent to them. In view of its simplicity, this solution has been introduced in the 3G standard in the implementation stage.

The essential characteristics of this solution adopted by the 3GPP/UMTS standard may be inferred from the diagram of FIG. 1. This scheme for data encoding, which is applicable in the cellular-communication environment in so far as it functions also with just one antenna in reception, basically envisages that the sequence of the input bits ($b_0$, $b_1$, $b_2$, $b_3$) is transmitted unaltered via a first antenna A and is, instead, subjected to a combined action of shuffling and of complementing that is such as to bring the sequence of four bits referred to previously to be sent for transmission via the second antenna in the form of the modified sequence ($b_2$, $b_3$, $b_0$, $b_1$).

From the point of view of QPSK coding and its representation in complex notation, this operation on the bits is mapped in a conjugation if the second bit (LSB) of the pair is complemented or in a conjugation with phase reversal (i.e., multiplication by −1) in the case where it is the first bit (MSB) of the pair that is complemented.

To complete the picture of the currently available solutions, it is also possible to cite the technique known as BLAST (Bell Labs Layered Space-Time), which contemplates the use of more than one antenna both in transmission and in reception. With this technique, spectral efficiencies higher than 30 bits/sec/Hz have been obtained, which cannot be obtained with conventional detection schemes, in environments that are not very noisy or not noisy at all and affected by multiple reflections.

Also a solution known as V-BLAST (Vertical BLAST) can be cited, which is substantially based upon a scheme that is simplified as compared to the BLAST technique, such as not to require codings between the flows transmitted and such as to enable, albeit with a presumably lower complexity, a performance in terms of spectral efficiency that is comparable with that of the BLAST technique.

At the moment, there are being studied techniques that envisage further improvement of the performance of the system by increasing the number of antennas in transmission and by partially modifying encoding, albeit by maintaining the compatibility with respect to the preceding versions of the 3GPP/UMTS standard—Release 1999.

For example, in the document RP020130 (now TR25.869) entitled "Tx diversity solutions for multipath antennas" presented at the TSG-RAN Meeting No. 15 held on Mar. 5-8, 2002, there is proposed the solution represented in FIG. 2.

This is, in practice, a scheme that contemplates the presence of four antennas or, more precisely, four pseudo-antennas designated, respectively, by $A_a$, $A_b$, $A_c$ and $A_d$. By adopting said scheme, the input signal x(t) is subjected, in a block designated by S, to the STTD-Rel. '99 coding procedure for each pair of antennas. This procedure uses the technique also known as Alamouti space-time block coding for generating two distinct signals $x_1$ and $x_2$, which are to be subjected first to a multiplication by respective factors X and ξ in two multipliers in view of the supply to the antennas $A_a$ and $A_c$. The same signals are once again subjected to a multiplication by two factors $e^{j\Phi}$ and $e^{j\Psi}$, respectively, (in practice, a phase rotation is performed) in view of the supply to the antennas $A_b$ and $A_d$.

In practice, the pseudo-antennas in question are defined, respectively, as:

$A_a = A_1 + A_2$, $A_b = A_3 + A_4$, $A_c = A_1 - A_2$, and $A_d = A_3 - A_4$, in the case where a balancing of power is required between the transmitting antennas; otherwise, we have:

$A_a = A_1$, $A_b = A_2$, $A_c = A_3$, and $A_d = A_4$, where $A_1$, $A_2$, $A_3$ and $A_4$ are the physical antennas.

The diagram represented in FIG. 2 uses the Alamouti technique, which is based upon the concept of transmitting the first branch with diversity according to the STTD scheme ($s_1$, $s_2$, ...) via a first antenna ($A_1$) and a replica subjected to phase rotation via the second antenna ($A_2$). The second branch with STTD diversity is transmitted in a similar way via the antennas $A_3$ and $A_4$.

Once again, FIG. 3 illustrates schematically a technique referred to as "phase hopping", which contemplates a phase rotation between the antennas and between the symbols according to a given sequence of values (by maintaining the phase constant for at least two consecutive symbols).

In particular, the phase patterns proposed for the pseudo-antenna 2 and for the pseudo-antenna 4 are respectively: {0, 135, 270, 45, 180, 315, 90, 225} and {180, 315, 90, 225, 0, 135, 270, 45}, i.e., $\phi = \Psi + \pi$. Of course, the values indicated in braces refer to angles expressed in degrees.

BRIEF SUMMARY OF THE INVENTION

One embodiment of the present invention provides an innovative solution for a diversity transmission scheme, which can be applied, for example, in a 3GPP UMTS system with more than two antennas, whilst maintaining, however, a complete compatibility with the currently standardized STTD scheme and, in general, with the transmission schemes that envisage using just two antennas in transmission.

An embodiment of the invention also regards a corresponding transmitter, a corresponding receiver and also a computer product directly loadable into the memory of at least a digital computer and comprises software code portions for performing the steps of a method according to the invention when the computer product is run on a computer.

An idea underlying an embodiment of the solution described herein contemplates inserting a further degree of freedom in the four-antenna system, separating the two pairs of antennas.

This can be obtained using for each of the two pairs of antennas:

a different CDMA code—for example, a different OVSF (Orthogonal Variable Spreading Factor) code or equivalent, such as a different Walsh-Hadamard (WH) code—and the same scrambling code; or else the same CDMA code, but with a different scrambling code.

In addition, the encoding on the two new antennas is partially changed by inserting an interleaving operation on 4 symbols—in this case (more in general on M symbols), whilst on the first two antennas the coding of the Release '99 standard is maintained to ensure compatibility in regard to systems that use the preceding versions of the standard.

In this connection, it is to be noted that the Release '99 in question is in course of implementation, and the first services are at the moment served on limited areas by some operators. This enables a higher performance to be achieved both with respect to the current scheme and with respect to the scheme currently under discussion at the 3GPP, eliminating at the same time the need for implementing a phase-hopping technique on the antennas 2 and 4, this being an operation which of course presupposes the need to have available corresponding circuits, of which it is, instead, possible to do without by adopting the technique described herein.

BRIEF DESCRIPTION OF THE SEVERAL VIEWS OF THE DRAWINGS

One or more embodiments of the invention will now be described, purely by way of non-limiting example, with reference to the annexed drawings, in which.

DETAILED DESCRIPTION

Embodiments of a method for transmitting signals using antenna diversity, for instance in mobile communication systems, transmitter, receiver and computer program product therefor are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

An embodiment of the solution provided herein refers to the case of the use of four transmission antennas designated respectively by Tx1, Tx2 and Tx3, Tx4.

The solution described herein can, however, be extended also to a larger number of antennas. This can be obtained in a simple way both by varying the length of the interleaving on the additional pairs of antennas and by using another channeling/spreading code for these antennas, albeit maintaining unvaried the data rate. The implementation of such extensions on the basis of what is described herein constitutes for a person skilled in the art a design task such as not to require a further detailed description herein.

In this connection, it is once again to be noted that the aforesaid extensions do not in general entail an added burden in terms of hardware in so far as the generic base station of a third-generation mobile communication system (BTS 3G) must already be able to transmit all of the codes simultaneously.

Figure 4:
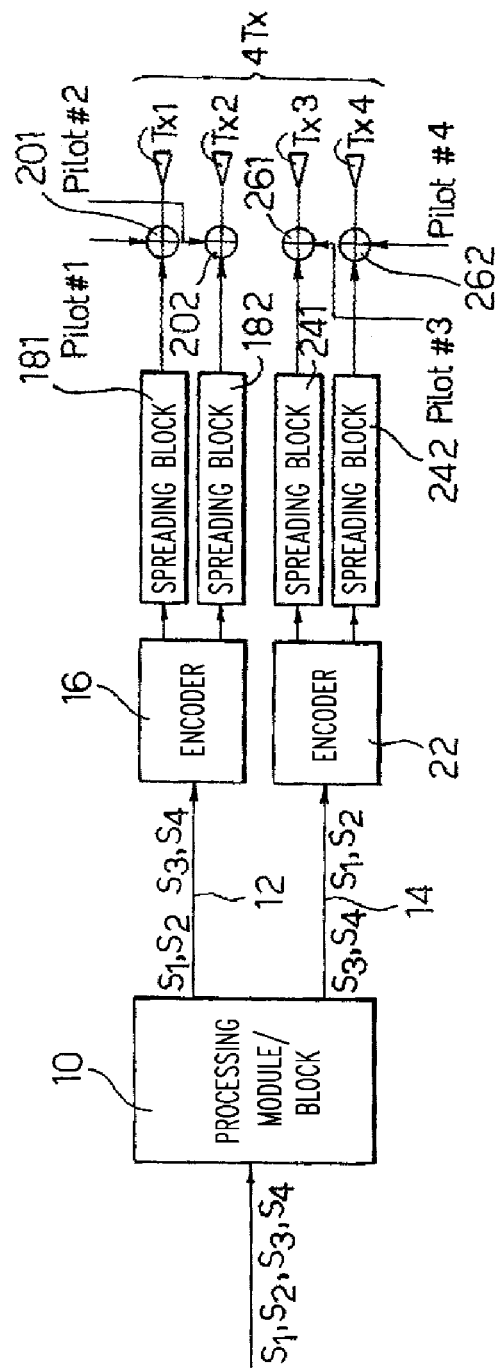
FIG. 4 is a block diagram illustrating an embodiment of the transmission technique described herein.

In the diagram of FIG. 4, it is assumed that there is at input a flow of data $S_1$, $S_2$, $S_3$, $S_4$ coming from a generic modulator a known type (M-PSK or M-QAM).

Said flow of data is sent to a block 10 capable of performing simultaneously a demultiplexing function (DMUX), together with a permutation function.

Basically, the module 10 splits the flow of input data between two lines designated, respectively, by 12 and 14.

On the output line 12, the data flow is sent without undergoing any variation, then to be transmitted to an STTD encoder 16 built in accordance with Release '99 of the 3GPP standard. There are then provided subsequent spreading operations with a code $c_1$ implemented in blocks 181, 182 in view of forwarding to the antennas Tx1 and Tx2 after prior combination, in two adder nodes designated, respectively, by 201 and 202, with the respective pilot flows, which are to be used by the receiver for channel estimation.

The portion of the transmitter associated to the output line 14 of the block 10 is structurally similar, in the sense that this too comprises an STTD encoder designated by 22, with associated thereto at output two spreading modules 241, 242, which are to generate signals with a correspondingly widened spectrum. These signals are then supplied to the antennas Tx3 and Tx4 after addition of the respective pilot flows in two nodes designated by 261 and 262, respectively.

The basic differences between the two "channels" coming under the lines 12 and 14 are the following:

whereas on the line 12 there is present the unaltered flow of data, just as it comes from the modulator at input to the block 10, on the line 14 there is present a data flow in which each set of four symbols is temporally swapped (and consequently subjected to shuffling or interleaving) by subsets, typically in pairs, causing the sequence ($S_1$, $S_2$, $S_3$, $S_4$) to become, at output from block 10, the sequence ($S_3$, $S_4$, $S_1$, $S_2$); and the spreading operation performed in the blocks 241 and 242 uses a second code $c_2$, different from the code $c_1$ used by the spreading blocks 181, 182; in other words, the two pairs of antennas Tx1, Tx2, on the one hand, and Tx3, Tx4, on the other hand, use different spreading codes, i.e., $c_1$ and $c_2$, respectively.

Figure 5:
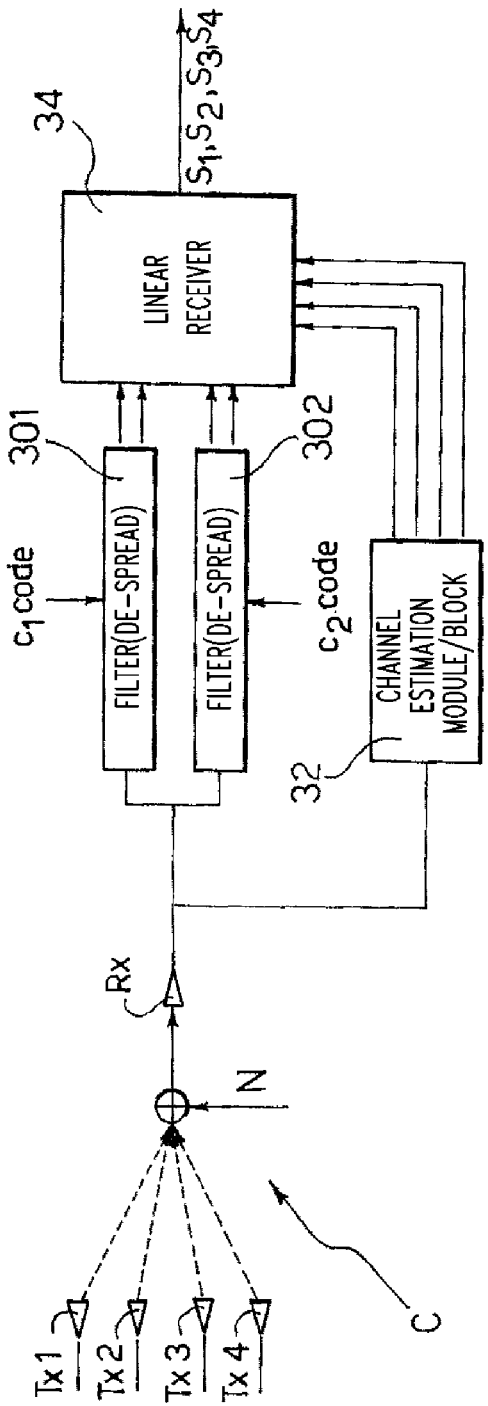
FIG. 5 illustrates an embodiment of the corresponding reception technique.

The corresponding reception and decoding system, illustrated in FIG. 5, contemplates the presence of a receiving antenna Rx, which is to receive, in a combined way, the signals coming from the transmission antennas Tx1, Tx2, Tx3 and Tx4. The signals received present, of course, the typical alterations induced by propagation in the transmission channel C, namely, the addition of noise N and the presence, in the signals received by the various transmission antennas, of phenomena of multipath fading that act in different ways in regard to each signal (this fact being, precisely, at the basis of the operation of diversity techniques).

The signal coming from the receiving antenna Rx is sent to two matched filters 301 and 302, which are to perform the de-spreading operation, eliminating the two spreading codes $c_1$ and $c_2$ introduced in the transmission stage.

The operation of the filters 301, 302 is based upon the formulae given in what follows, which have been developed just for the case of just one antenna in reception but can be extended (according to criteria that are evident to a person skilled in the art) to the case of more than one antenna in reception.

In particular, the signal received in four signalling intervals can be expressed in the following way:

$$r_1 = S_1 h_1' c_1 - S_2 {}^* h_2' c_1 + S_3 h_3' c_2 - S_4 {}^* h_4' c_2$$

$$r_2 = S_2 h_1' c_1 - S_1 {}^* h_2' c_1 + S_4 h_3' c_2 - S_3 {}^* h_4' c_2$$

$$r_3 = S_3 h_1'' c_1 - S_4 {}^* h_2'' c_1 + S_1 h_3'' c_2 - S_2 {}^* h_4'' c_2$$

$$r_4 = S_4 h_1'' c_1 - S_3 {}^* h_2'' c_1 + S_2 h_3'' c_2 - S_1 {}^* h_4'' c_2$$

where:
 - $h_i'$ and $h_i''$ represent the channel coefficients, and
 - $c_1$ and $c_2$ are the two spreading codes used on the two pairs of antennas Tx1, Tx2 and Tx3, Tx4, respectively.

In the example given above, there has been considered, for reasons of simplicity, just one path from the generic transmitting antenna to the receiving antenna, but the mathematical expression given above can be readily extended—as is evident for a person skilled in the art—to the case of propagation on multiple paths, in general on N different paths.

The channel coefficients $h_i'$ and $h_i''$ are assumed as being more or less constant (or estimated to be such) on two symbol time intervals. The corresponding estimation, implemented according to what is proposed by the 3G standard in Release '99 (but also already starting from Release 5), is performed according to known criteria in a channel-estimation block 32 that sends the corresponding coefficients to a linear receiver 34, which is to supply at output the symbols received $S_1$, $S_2$, $S_3$, $S_4$.

It will, however, be appreciated that the solution described herein, as regards the channel-estimation function, is in no way tied down to the adoption of the specific technique described in the 3G standard. The solution described herein can in fact be used also together with other estimation methods.

After executing the de-spreading operation, in the first two symbol time intervals, there is obtained:

$$S_1' = h_1'{}^* r_{11} + h_2' r_{21}{}^*$$

$$S_2' = h_2' r_{11}{}^* + h_1'{}^* + r_{21}$$

$$S_3' = h_3'{}^* r_{12} + h_4' r_{22}{}^*$$

$$S_4' = -h_4' r_{12}{}^* + h_3' + r_{22}$$

whence we obtain the estimates $S_1'\ S_2'\ S_3'\ S_4'$.

After another two symbol time intervals there is likewise obtained:

$$S_1' = h_3''{}^* r_{32} + h_4'' r_{42}{}^*$$

$$S_2' = -h_4'' r_{32}{}^* + h_3''{}^* + r_{42}$$

$$S_3' = h_1''{}^* r_{31}{}^* + h_2'' r_{41}{}^*$$

$$S_4'' = -h_2'' r_{31}{}^* + h_1''{}^* + r_{41}$$

whence we obtain the estimates $S_1''\ S_2''\ S_3''\ S_4''$, where $$r_{11} = r_1 c_1$$

$$r_{12} = r_1 c_2$$

$$r_{21} = r_2 c_1$$

$$r_{22} = r_2 c_2$$

$$r_{31} = r_3 c_1$$

$$r_{32} = r_3 c_2$$

$$r_{41} = r_4 c_1$$

$$r_{42} = r_4 c_2$$

Finally, the estimates of the four symbols received are extracted by summing the two sets of partial estimates according to the relations:

$$\tilde{S}_1 = S_1' + S_1''$$

$$\tilde{S}_2 = S_2' + S_2''$$

$$\tilde{S}_3 = S_3' + S_3''$$

$$\tilde{S}_4 = S_4' + S_4''$$

The estimates in question constitute, precisely, the output signals indicated in the diagram of FIG. 5 by $S_1\ S_2\ S_3\ S_4$.

The above convention has been adopted for reasons of simplicity, taking into account the fact that, clearly, the estimation of the output signals corresponds exactly to the input signals transmitted, i.e., the signals sent at input to the block 10 of FIG. 4 in the case of ideal operation of the system.

It will be appreciated that the decoding technique just described can be readily extended to the case of M generic pairs of transmitting antennas with M>2. Also in this case, the result can be obtained simply (and according to criteria that are evident for a person skilled in the art on the basis of the indications here provided) both by varying the interleaving length on the pairs of additional antennas, and by using another channeling/spreading code for them.

Also at the receiver end, it is possible to use a number of receiving antennas. Given that the reception system is linear, using the same method just described for each receiving antenna, the total estimate of the symbol will now be given by the sum of the various contributions of estimation supplied by each receiving antenna.

The tests conducted by the present applicant show that the adoption of an embodiment of the technique just described leads to considerable advantages in terms of performance. This applies as regards the performance in terms of bit-error rate (BER) and according to a direct comparison with the proposals currently under debate at the 3GPP (usually indicated by the post-fix "Rel5").

With respect to the known solution referred to above, one embodiment of the technique described herein moreover enables elimination from the base station of the phase-rotation function and the corresponding circuit (both at a hardware level and at the level of software components) by maintaining, at the same time, the so-called full rate; in other words, space-time coding does not reduce the transmission data rate. The results of the comparisons to which reference has been made previously used the same channel-estimation system proposed by the standard.

Once again, the demodulation technique described herein is maintained in the linear form, involving just de-spreading on two or more codes, which can be rendered perfectly serial and in line with a possible adoption of multiple-code transmission for a single client already envisaged by the standard.

Figure 1:
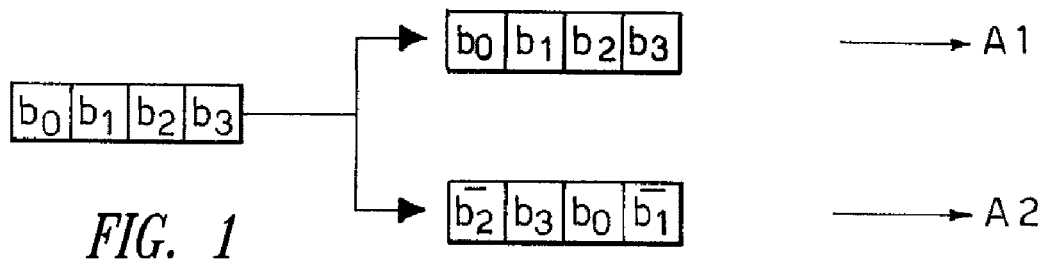
FIGS. 1 to 3, which regard the prior art, have already been described previously.
Figure 2:
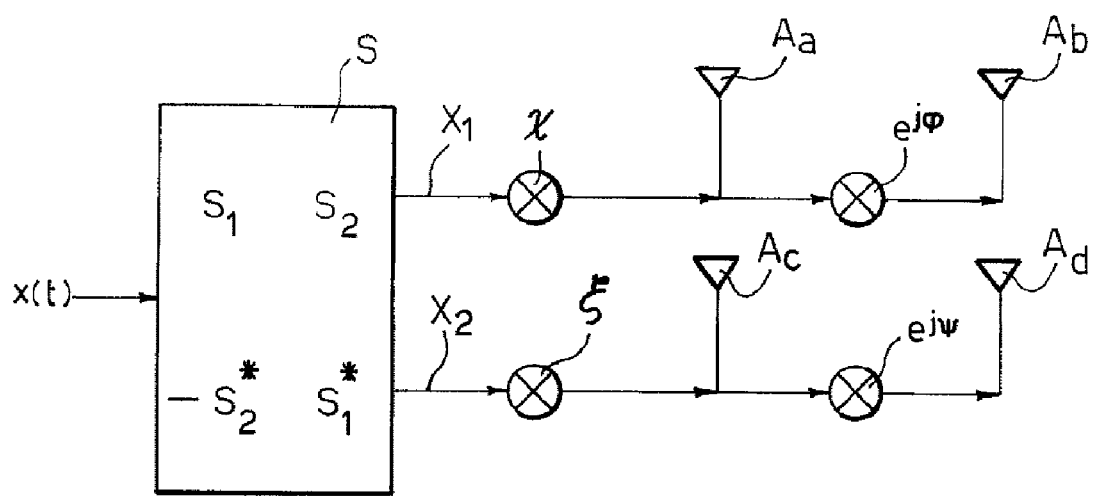
Figure 3:
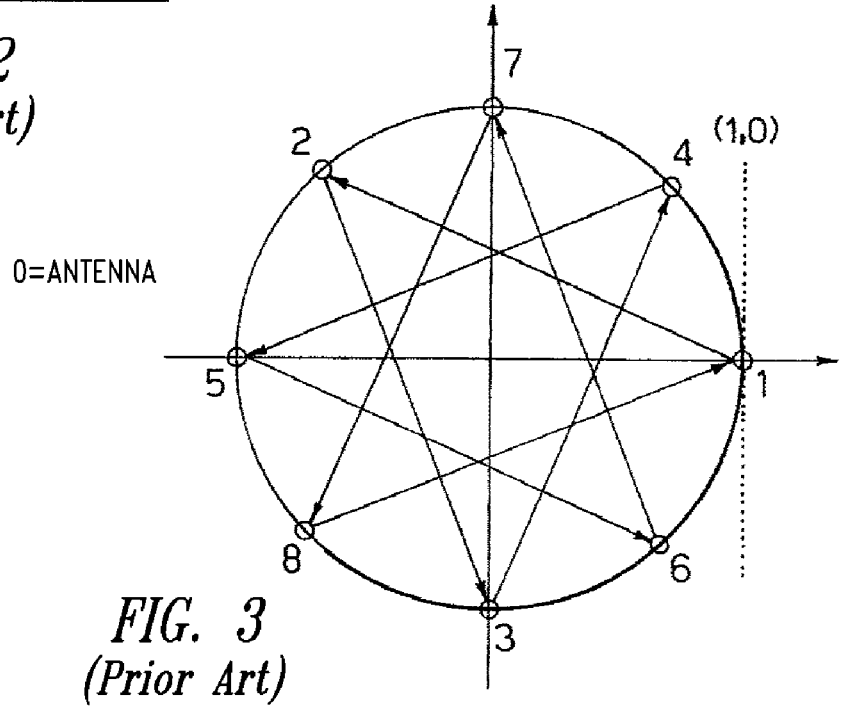

Of course, as already indicated previously, instead of using, as in the example embodiments illustrated herein, two different scrambling codes $c_1$, $c_2$, with a solution that is altogether equivalent it is possible to keep the same scrambling code for the two sets of spreading blocks 181, 182 and 241, 242 illustrated in FIG. 2, using, however, for the two channels corresponding to the lines 12 and 14, at output from the module 10, two different codes of the OVSF type (or of any other type that can be used in a CDMA scheme).

Consequently, without prejudice to the principle of the invention, the details of implementation and the embodiments may vary widely with respect to what is described and illustrated herein, without thereby departing from the scope of the present invention, as this is defined in the claims that follow.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety. These items referred to in the specification and/or listed in the Application Data Sheet that are incorporated by reference include the following:

G.J. Foschini et al. in Bell Labs Tech. J., Autumn 1996;
Telatar, "Capacity of multiantenna Gaussian channels" AT&T Bell Labs, Tech, Rep., June 1995;
Foschini and Gans in Wireless Personal Comm., March 1998;
Third Generation Partnership Project/Universal Mobile Telecommunications System (3GPP/UMTS) standard—Release 1999;
RP020130 (now TR25.869), "Tx diversity solutions for multipath antennas", presented at the TSG-RAN Meeting No. 15, Mar. 5-8, 2002; and
European Patent Application No. 03425535.6, filed Aug. 5, 2003.

What is claimed is:

1. A method for transmitting, via a first pair of antennas and at least one second pair of antennas, encoded digital symbols produced according to a modulation scheme, the method comprising: organizing digital symbols in sets, at least one set of the sets of symbols that is used for transmission via said at least one second pair of antennas being swapped temporally by subsets of symbols with respect to the digital symbols used for transmission via said first pair of antennas; using for transmission via said first pair of antennas a signal obtained by subjecting said organized digital symbols to spreading with a code-division-multiple-access code, to space-time coding, to scrambling with a scrambling code, and to adding with respective pilot flows for channel estimation; using for transmission via said at least one second pair of antennas a signal obtained by subjecting said swapped temporally set of symbols to spreading with a code-division-multiple-access code, to space-time coding, to scrambling with a scrambling code, and to adding with respective pilot flows for channel estimation, wherein at least one between said code-division-multiple-access code and said scrambling code used for the transmission via said at least one second pair of antennas is different from the code-division-multiple-access code and said scrambling code used for the transmission via said first pair of antennas; using, in addition to said first pair of antennas, a plurality of second pairs of antennas, sets of symbols used for transmission via said plurality of second pairs of antennas being swapped temporally by subsets of symbols with respect to the digital symbols used for transmission via said first pair of antennas; and using, for transmission via said plurality of second pairs of antennas, signals obtained by subjecting said swapped temporally sets of symbols to spreading with respective code-division-multiple-access codes, to space-time coding, to scrambling with respective scrambling codes, and to adding with respective pilot flows for channel estimation;

wherein at least one between said respective code-division-multiple-access codes and said respective scrambling codes used for transmission via said plurality of second pairs of antennas is different from the code-division-multiple-access code and said scrambling code used for transmission via said first pair of antennas.

2. The method according to claim 1 wherein said code-division-multiple-access code used for the transmission via said at least one first pair of antennas and said code-division-multiple-access code used for the transmission via said at least one second pair of antennas are orthogonal variable spreading factor (OVSF) codes.

3. The method according to claim 1, further comprising using for transmission via said first pair of antennas and for transmission via said at least one second pair of antennas a same code-division-multiple-access code, using, instead, for transmission via said first pair of antennas and for transmission via said at least one second pair of antennas different scrambling codes.

4. The method according to claim 1 wherein said encoded digital symbols are produced according to said modulation scheme chosen from a group consisting of M-PSK and M-QAM.

5. The method according to claim 1 wherein said sets include four encoded digital symbols.

6. The method according to claim 1 wherein said subsets of symbols are made up of pairs of symbols.

7. A transmitter to transmit, via a first pair of antennas and at least one second pair of antennas, encoded digital symbols produced according to a modulation scheme, the transmitter comprising:
a processing module configured to organize digital symbols in sets, at least one set from the sets of symbols that is used for transmission via said at least one second pair of antennas being swapped temporally by subsets of symbols with respect to the digital symbols used for transmission via said first pair of antennas;
a first channel, coupled to said processing module, to provide a signal for the transmission via said first pair of antennas; wherein to provide said signal, said first channel includes:
a first encoder adapted to subject said organized digital symbols to space-time coding;
first spreading blocks coupled to said first encoder and adapted to subject said organized digital symbols to spreading with a code-division-multiple-access code and to scrambling with a scrambling code; and
first adders coupled to said first spreading blocks to add respective pilot flows for channel estimation; and
a second channel, coupled to said processing module, to provide a signal for the transmission via said second pair of antennas; wherein to provide said signal, said second channel includes:
a second encoder adapted to subject said swapped temporally set of symbols to space-time coding;
second spreading blocks coupled to said second encoder and adapted to subject said swapped temporally set of symbols to spreading with a code-division-multiple-access code and to scrambling with a scrambling code; and
second adders coupled to said second spreading blocks to add respective pilot flows for channel estimation;
wherein at least one between said code-division-multiple-access code and said scrambling code used for transmission via said at least one second pair of antennas is different from the code-division-multiple-access code and said scrambling code used for the transmission via said first pair of antennas.

8. The transmitter according to claim 7 wherein said code-division-multiple-access code used for the transmission via said at least one first pair of antennas and said code-division-multiple-access code used for the transmission via said at least one second pair of antennas are orthogonal variable spreading factor (OVSF) codes.

9. The transmitter according to claim 7 wherein said first spreading blocks and said second blocks are configured to respectively use, for the transmission via said first pair of antennas and for the transmission via said at least one second pair of antennas, a same code-division-multiple-access code, and are configured to use, instead, for the transmission via said first pair of antennas and for the transmission via said at least one second pair of antennas, different scrambling codes.

10. The transmitter according to claim 7, further comprising an input modulator chosen from a group consisting of an M-PSK modulator and an M-QAM modulator to generate said encoded digital symbols.

11. The transmitter according to claim 7 wherein said processing module is configured to organize said sets as sets having four encoded digital symbols.

12. The transmitter according to claim 7 wherein said processing module is configured to organize said subsets of symbols as pairs of symbols.

13. The transmitter according to claim 7 wherein:
said at least one second pair of antennas includes a plurality of second pairs of antennas;
said processing module is configured to swap, temporally by subsets, sets of symbols used for transmission via said plurality of second pairs of antennas with respect to the digital symbols used for transmission via said first pair of antennas; and
said second channel is configured to generate, for transmission via said plurality of second pairs of antennas, signals obtained by subjecting said swapped temporally sets of symbols to spreading with respective code-division-multiple-access codes, to space-time coding, to scrambling with respective scrambling codes, and to adding with respective pilot flows for channel estimation; and
at least one between said respective code-division-multiple-access codes and said respective scrambling codes used for transmission via said plurality of second pairs of antennas is different from the code-division-multiple-access code and said scrambling code used for transmission via said first pair of antennas.

14. A receiver to receive, via at least one antenna, encoded digital symbols transmitted via a first pair of antennas and at least one second pair of antennas, wherein: said digital symbols are organized in sets, at least one of the sets of symbols that is used for transmission via said at least one second pair of antennas being swapped temporally by subsets of symbols with respect to the digital symbols used for transmission via said first pair of antennas; for transmission of a signal via said first pair of antennas and for transmission of a signal via said at least one second pair of antennas, space-time coding is used and a same code-division-multiple-access code is used, while, for transmission via said first pair of antennas and for transmission via said at least one second pair of antennas, there are used scrambling codes that are different from one another; said receiver comprising at least one de-spreading device to eliminate, from received said transmitted signals, said scrambling codes that are different from one another; use, in addition to said first pair of antennas, a plurality of second pairs of antennas, sets of symbols used for transmission via said plurality of second pairs of antennas being swapped temporally by subsets of symbols with respect to the digital symbols used for transmission via said first pair of antennas; and use, for transmission via said plurality of second pairs of antennas, signals obtained by subjecting said swapped temporally sets of symbols to spreading with respective (CDMA) codes, to space-time coding, to scrambling with respective scrambling codes, and to adding with respective pilot flows for channel estimation;
wherein at least one between said respective CDMA codes and said respective scrambling codes used for transmission via said plurality of second pairs of antennas is different from the CDMA code and said scrambling code used for transmission via said first pair of antennas.

15. The receiver according to claim 14 wherein said at least one de-spreading device includes a matched filter.

16. The receiver according to claim 14 wherein said at least one de-spreading device includes two de-spreading units.

17. The receiver according to claim 14, further comprising a channel-estimation module to derive estimates of a transfer function of a channel between said first pair of antennas and said at least one second pair of antennas, at one end, and said at least one receiving antenna, at another end.

18. The receiver according to claim 17, further comprising a linear receiver module coupled to said at least one de-spreading device to receive said signals received by said at least one receiving antenna cleared of said scrambling codes, and to derive therefrom estimates according to channel coefficients produced by said channel-estimation module.

19. The receiver according to claim 14 wherein the receiver is configured to use a plurality of receiving antennas, operating on a linear combination of signals transmitted by a plurality of transmitting antennas.

20. A computer-readable medium having stored thereon a computer program product executable by at least one digital computer and which includes software code portions to perform, when the product is executed by the computer: organize digital symbols in sets, at least one set of the sets of symbols being usable for transmission via at least one second pair of antennas and being swapped temporally by subsets of symbols with respect to digital symbols usable for transmission via a first pair of antennas; use, for transmission via the first pair of antennas, a signal obtained by subjecting said organized digital symbols to spreading with a code-division-multiple-access (CDMA) code, to space-time coding, to scrambling with a scrambling code, and to adding with respective pilot flows for channel estimation; and use, for transmission via the at least one second pair of antennas, a signal obtained by subjecting said swapped temporally set of symbols to spreading with a CDMA code, to space-time coding, to scrambling with a scrambling code, and to adding with respective pilot flows for channel estimation; wherein at least one between the CDMA code and the scrambling code usable for transmission via the at least one second pair of antennas is different from the CDMA code and the scrambling code usable for transmission via the first pair of antennas; use, in addition to said first pair of antennas, a plurality of second pairs of antennas, sets of symbols used for transmission via said plurality of second pairs of antennas being swapped temporally by subsets of symbols with respect to the digital symbols used for transmission via said first pair of antennas; and use, for transmission via said plurality of second pairs of antennas, signals obtained by subjecting said swapped temporally sets of symbols to spreading with respective CDMA codes, to space-time coding, to scrambling with respective scrambling codes, and to adding with respective pilot flows for channel estimation; wherein at least one between said respective CDMA codes and said respective scrambling codes used for transmission via said plurality of second pairs of antennas is different from the CDMA code and said scrambling code used for transmission via said first pair of antennas.

21. The computer-readable medium of claim 20 wherein the computer program product includes software code portions executable by the computer to perform:
use, for transmission via the first pair of antennas and for transmission via the at least one second pair of antennas, a same CDMA code using, and for transmission via the first pair of antennas and for transmission via the at least one second pair of antennas, different scrambling codes.

22. A system for communicating, via a plurality of first antennas and a plurality of second antennas, digital symbols produced according to a modulation scheme, the system comprising: means for organizing digital symbols in sets, at least one set of the sets of symbols being usable for transmission via the second antennas and being swapped temporally by subsets of symbols with respect to digital symbols usable for transmission via the first antennas; means for using, for transmission via the first antennas, a signal obtained by subjecting said organized digital symbols to spreading with a first code, to space-time coding, to scrambling with a scrambling code, and to adding with respective pilot flows for channel estimation; and means for using, for transmission via the second antennas, a signal obtained by subjecting said swapped temporally set of symbols to spreading with a second code, to space- time coding, to scrambling with a scrambling code, and to adding with respective pilot flows for channel estimation; wherein at least one between the second code and the scrambling code usable for transmission via the second antennas is different from the first code and the scrambling code usable for transmission via the first antennas; means for using, in addition to said first pair of antennas, a plurality of second pairs of antennas, sets of symbols used for transmission via said plurality of second pairs of antennas being swapped temporally by subsets of symbols with respect to the digital symbols used for transmission via said first pair of antennas; and means for using, for transmission via said plurality of second pairs of antennas, signals obtained by subjecting said swapped temporally sets of symbols to spreading with respective code-division-multiple-access (CDMA) codes, to space-time coding, to scrambling with respective scrambling codes, and to adding with respective pilot flows for channel estimation; wherein at least one between said respective CDMA codes and said respective scrambling codes used for transmission via said plurality of second pairs of antennas is different from the CDMA code and said scrambling code used for transmission via said first pair of antennas.

23. The system of claim 22 wherein the first code and the second code include code-division-multiple-access (CDMA) codes.

24. The system of claim 22 wherein said means for using, for transmission via the first antennas and for transmission via the second antennas, use same first and second codes and use, for transmission via the first antennas and for transmission via the second antennas, different scrambling codes.

25. The system of claim 22, further comprising de-spreading means for substantially eliminating, from received said signals transmitted via said first and second antennas, said scrambling codes.

26. The system of claim 25, further comprising:
channel-estimating means for deriving estimates of a transfer function of a channel between the first and second antennas at one end and at least a third antenna at another end; and
means for receiving the signals having the scrambling codes substantially eliminated by the de-spreading means, and for deriving estimates according to channel coefficients produced by the channel-estimating means.

27. An apparatus to transmit, via a plurality of first antennas and a plurality of second antennas, digital symbols produced according to a modulation scheme, the apparatus comprising: a processing module to organize the digital symbols in sets, at least one set of the sets of symbols being usable for transmission via the second antennas and being swapped temporally by subsets of symbols with respect to digital symbols usable for transmission via the first antennas; a first unit coupled to the processing module to generate, for transmission via the first antennas, a signal obtained by subjecting said organized digital symbols to spreading with a first code, to space-time coding, to scrambling with a scrambling code, and to adding with respective pilot flows for channel estimation; and a second unit coupled to the processing module to generate, for transmission via the second antennas, a signal obtained by subjecting said swapped temporally set of symbols to spreading with a second code, to space-time coding, to scrambling with a scrambling code, and to adding with respective pilot flows for channel estimation, wherein at least one between the second code and the scrambling code usable for transmission via the second antennas is different from the first code and the scrambling code usable for transmission via the first antennas; a third unit coupled to use, in addition to said first pair of antennas, a plurality of second pairs of antennas, sets of symbols used for transmission via said plurality of second pairs of antennas being swapped temporally by subsets of symbols with respect to the digital symbols used for transmission via said first pair of antennas; and a fourth unit coupled to generate, for transmission via said plurality of second pairs of antennas, signals obtained by subjecting said swapped temporally sets of symbols to spreading with respective code-division-multiple-access (CDMA) codes, to space-time coding, to scrambling with respective scrambling codes, and to adding with respective pilot flows for channel estimation; wherein at least one between said respective CDMA codes and said respective scrambling codes used for transmission via said plurality of second pairs of antennas is different from the (CDMA) code and said scrambling code used for transmission via said first pair of antennas.

28. The apparatus of claim 27 wherein the first and second units each include an encoder module to perform said space-time coding, at least one spreading module coupled to the encoding module to perform said spreading and scrambling, and at least one adder coupled to said at least one spreading module to perform said adding.

29. The apparatus of claim 27 wherein the first code and the second code include code-division-multiple-access (CDMA) codes.

30. The apparatus of claim 27 wherein the processing module is configured to organize the subsets of symbols as pairs of symbols.

31. A system in which digital symbols are communicated, the system comprising: at least one reception antenna to receive signals having the digital symbols, the digital symbols being transmitted via a first transmission antennas and second transmission antennas and being organized in sets, at least one set of the sets of symbols that is used for transmission via the second transmission antennas being swapped temporally by subsets of symbols with respect to the digital symbols used for transmission via the first transmission antennas; wherein for transmission via the first transmission antennas and for transmission via the second transmission antennas, space-time coding is used and at least one between code- division-multiple-access (CDMA) codes and scrambling codes are different; and at least one de-spreading device coupled to the at least one reception antenna to substantially eliminate, from the signals received by the at least one reception antenna, said scrambling codes that are different from one another; a plurality of second pairs of antennas, sets of symbols used for transmission via said plurality of second pairs of antennas being swapped temporally by subsets of symbols with respect to the digital symbols used for transmission via said first pair of antennas; and use, for transmission via said plurality of second pairs of antennas, signals obtained by subjecting said swapped temporally sets of symbols to spreading with respective CDMA codes, to space-time coding, to scrambling with respective scrambling codes, and to adding with respective pilot flows for channel estimation; wherein at least one between said respective CDMA codes and said respective scrambling codes used for transmission via said plurality of second pairs of antennas is different from the CDMA code and said scrambling code used for transmission via said first pair of antennas.

32. The system of claim 31, further comprising a transmitter including:
  a processing module to organize the digital symbols in the sets;
  a first unit coupled to the processing module to generate, for transmission via the first transmission antennas, a signal obtained by subjecting said organized digital symbols to spreading with a CDMA code, to space-time coding, to scrambling with a scrambling code, and to adding with respective pilot flows for channel estimation; and
  a second unit coupled to the processing module to generate, for transmission via the second transmission antennas, a signal obtained by subjecting said swapped temporally set of symbols to spreading with a CDMA code, to space-time coding, to scrambling with a scrambling code, and to adding with respective pilot flows for channel estimation.

33. The system of claim 31, further comprising:
  a channel-estimation unit coupled to the reception antenna to derive estimates of a transfer function of a channel between the first and second transmission antennas at one end and the at least one reception antenna at another end; and
  a linear receiver module coupled to the at least one de-spreading device to receive the signals that have the scrambling codes substantially eliminated therefrom, and to derive estimates according to channel coefficients produced by the channel-estimation unit.

34. The system of claim 31 wherein the at least one de-spreading device includes a matched filter.

* * * * *

UNITED STATES PATENT AND TRADEMARK OFFICE
CERTIFICATE OF CORRECTION

| | | |
|---|---|---|
| PATENT NO. | : 7,460,581 B2 | Page 1 of 10 |
| APPLICATION NO. | : 10/910955 | |
| DATED | : December 2, 2008 | |
| INVENTOR(S) | : Alberto Serratore et al. | |

It is certified that error appears in the above-identified patent and that said Letters Patent is hereby corrected as shown below:

<u>Column 8</u>
Lines 14-54,
"A method for transmitting, via a first pair of antennas and at least one second pair of antennas, encoded digital symbols produced according to a modulation scheme, the method comprising:
organizing digital symbols in sets, at least one set of the sets of symbols that is used for transmission via said at least one second pair of antennas being swapped temporally by subsets of symbols with respect to the digital symbols used for transmission via said first pair of antennas; using for transmission via said first pair of antennas a signal obtained by subjecting said organized digital symbols to spreading with a code division-multiple-access code, to space-time coding, to scrambling with a scrambling code, and to adding with respective pilot flows for channel estimation; using for transmission via said at least one second pair of antennas a signal obtained by subjecting said swapped temporally set of symbols to spreading with a code-division-multiple-access code, to space-time coding, to scrambling with a scrambling code, and to adding with respective pilot flows for channel estimation, wherein at least one between said code-division-multiple-access code and said scrambling code used for the transmission via said at least one second pair of antennas is different from the code-division-multiple-access code and said scrambling code used for the transmission via said first pair of antennas; using, in addition to said first pair of antennas, a plurality of second pairs of antennas, sets of symbols used for transmission via said plurality of second pairs of antennas being swapped temporally by subsets of symbols with respect to the digital symbols used for transmission via said first pair of antennas; and using, for transmission via said plurality of second pairs of antennas, signals obtained by subjecting said swapped temporally sets of symbols to spreading with respective code-division-multiple-access codes, to space-time coding, to scrambling with respective scrambling codes, and to adding with respective pilot flows for channel estimation;
wherein at least one between said respective code-division-multiple-access codes and said respective scrambling codes used for transmission via said plurality of second pairs of antennas is different from the code-division-multiple-access code and said scrambling code used for transmission via said first pair of antennas."
should read as
-- A method for transmitting, via a first pair of antennas and at least one second pair of antennas, encoded digital symbols produced according to a modulation scheme, the method comprising:
   organizing digital symbols in sets, at least one set of the sets of symbols that is used for transmission via said at least one second pair of antennas being swapped temporally by subsets of symbols with respect to the digital symbols used for transmission via said first pair of antennas;

(continued on p.2 of Certificate of Correction)

UNITED STATES PATENT AND TRADEMARK OFFICE
CERTIFICATE OF CORRECTION

PATENT NO.       : 7,460,581 B2
APPLICATION NO.  : 10/910955
DATED            : December 2, 2008
INVENTOR(S)      : Alberto Serratore et al.

It is certified that error appears in the above-identified patent and that said Letters Patent is hereby corrected as shown below:

(continuation of p.1 of the Certificate of Correction)
   using for transmission via said first pair of antennas a signal obtained by subjecting said organized digital symbols to spreading with a code-division-multiple-access code, to space-time coding, to scrambling with a scrambling code, and to adding with respective pilot flows for channel estimation;
   using for transmission via said at least one second pair of antennas a signal obtained by subjecting said swapped temporally set of symbols to spreading with a code-division-multiple-access code, to space-time coding, to scrambling with a scrambling code, and to adding with respective pilot flows for channel estimation, wherein at least one between said code-division-multiple-access code and said scrambling code used for the transmission via said at least one second pair of antennas is different from the code-division-multiple-access code and said scrambling code used for the transmission via said first pair of antennas;
   using, in addition to said first pair of antennas, a plurality of second pairs of antennas, sets of symbols used for transmission via said plurality of second pairs of antennas being swapped temporally by subsets of symbols with respect to the digital symbols used for transmission via said first pair of antennas; and
   using, for transmission via said plurality of second pairs of antennas, signals obtained by subjecting said swapped temporally sets of symbols to spreading with respective code-division-multiple-access codes, to space-time coding, to scrambling with respective scrambling codes, and to adding with respective pilot flows for channel estimation,
   wherein at least one between said respective code-division-multiple-access codes and said respective scrambling codes used for transmission via said plurality of second pairs of antennas is different from the code-division-multiple-access code and said scrambling code used for transmission via said first pair of antennas. --

Column 10
Lines 29-61,
"A receiver to receive, via at least one antenna, encoded digital symbols transmitted via a first pair of antennas and at least one second pair of antennas, wherein: said digital symbols are organized in sets, at least one of the sets of symbols that is used for transmission via said at least one second pair of antennas being swapped temporally by subsets of symbols with respect to the digital symbols used for transmission via said first pair of antennas; for transmission of a signal via said first pair of antennas and for transmission of a signal via said at least one second pair of antennas, space-time coding is used and a same code-division-multiple-access code is used, while, for transmission via said first pair of antennas and for transmission via said at least one second pair of antennas, there are used scrambling codes that are different from one another; said receiver comprising at least one de-spreading device to eliminate, from received (continued on p.3 of the Certificate of Correction)

UNITED STATES PATENT AND TRADEMARK OFFICE
CERTIFICATE OF CORRECTION

| | |
|---|---|
| PATENT NO. | : 7,460,581 B2 |
| APPLICATION NO. | : 10/910955 |
| DATED | : December 2, 2008 |
| INVENTOR(S) | : Alberto Serratore et al. |

It is certified that error appears in the above-identified patent and that said Letters Patent is hereby corrected as shown below:

(continuation of p.2 of the Certificate of Correction)
said transmitted signals, said scrambling codes that are different from one another; use, in addition to the first pair of antennas, a plurality of second pairs of antennas, sets of symbols usable for transmission via the plurality of second pairs of antennas being swapped temporally by subsets of symbols with respect to the digital symbols used for transmission via the first pair of antennas; and use, for transmission via the plurality of second pairs of antennas, signals obtained by subjecting said swapped temporally sets of symbols to spreading with respective (CDMA) codes, to space-time coding, to scrambling with respective scrambling codes, and to adding with respective pilot flows for channel estimation;
wherein at least one between the respective CDMA codes and the respective scrambling codes usable for transmission via the plurality of second pairs of antennas is different from the CDMA code and the scrambling code used for transmission via the first pair of antennas."
should read as
-- A receiver to receive, via at least one antenna, encoded digital symbols transmitted via a first pair of antennas and at least one second pair of antennas, wherein:
  said digital symbols are organized in sets, at least one of the sets of symbols that is used for transmission via said at least one second pair of antennas being swapped temporally by subsets of symbols with respect to the digital symbols used for transmission via said first pair of antennas;
  for transmission of a signal via said first pair of antennas and for transmission of a signal via said at least one second pair of antennas, space-time coding is used and a same code-division-multiple-access code is used, while, for transmission via said first pair of antennas and for transmission via said at least one second pair of antennas, there are used scrambling codes that are different from one another;
  said receiver comprising at least one de-spreading device to eliminate, from received said transmitted signals, said scrambling codes that are different from one another;
  use, in addition to the first pair of antennas, a plurality of second pairs of antennas, sets of symbols usable for transmission via the plurality of second pairs of antennas being swapped temporally by subsets of symbols with respect to the digital symbols used for transmission via the first pair of antennas; and
  use, for transmission via the plurality of second pairs of antennas, signals obtained by subjecting said swapped temporally sets of symbols to spreading with respective code-division-multiple-access (CDMA) codes, to space-time coding, to scrambling with respective scrambling codes, and to adding with respective pilot flows for channel estimation;
  wherein at least one between the respective CDMA codes and the respective scrambling codes usable for transmission via the plurality of second pairs of antennas is different from the CDMA code and the scrambling code used for transmission via the (continued on p.4 of the Certificate of Correction)

UNITED STATES PATENT AND TRADEMARK OFFICE
CERTIFICATE OF CORRECTION

PATENT NO.        : 7,460,581 B2
APPLICATION NO. : 10/910955
DATED              : December 2, 2008
INVENTOR(S)      : Alberto Serratore et al.

It is certified that error appears in the above-identified patent and that said Letters Patent is hereby corrected as shown below:

(continuation of p.3 of the Certificate of Correction)
first pair of antennas. --

Column 11
Lines 14-52,
"A computer-readable medium having stored thereon a computer program product executable by at least one digital computer and which includes software code portions to perform, when the product is executed by the computer: organize digital symbols in sets, at least one set of the sets of symbols being usable for transmission via at least one second pair of antennas and being swapped temporally by subsets of symbols with respect to digital symbols usable for transmission via a first pair of antennas; use, for transmission via the first pair of antennas, a signal obtained by subjecting said organized digital symbols to spreading with a code-division-multiple-access (CDMA) code, to space-time coding, to scrambling with a scrambling code, and to adding with respective pilot flows for channel estimation; and use, for transmission via the at least one second pair of antennas, a signal obtained by subjecting said swapped temporally set of symbols to spreading with a CDMA code, to space-time coding, to scrambling with a scrambling code, and to adding with respective pilot flows for channel estimation; at least one between the CDMA code and the scrambling code usable for transmission via the at least one second pair of antennas is different from the CDMA code and the scrambling code usable for transmission via the first pair of antennas; use, in addition to the first pair of antennas, a plurality of second pairs of antennas, sets of symbols usable for transmission via the plurality of second pairs of antennas being swapped temporally by subsets of symbols with respect to the digital symbols used for transmission via the first pair of antennas; and use, for transmission via the plurality of second pairs of antennas, signals obtained by subjecting said swapped temporally sets of symbols to spreading with respective CDMA codes, to space-time coding, to scrambling with respective scrambling codes, and to adding with respective pilot flows for channel estimation;
wherein at least one between the respective CDMA codes and the respective scrambling codes usable for transmission via the plurality of second pairs of antennas is different from the CDMA code and the scrambling code used for transmission via the first pair of antennas."
should read as
-- A computer-readable medium having stored thereon a computer program product executable by at least one digital computer and which includes software code portions to perform, when the product is executed by the computer:
   organize digital symbols in sets, at least one set of the sets of symbols being usable for transmission via at least one second pair of antennas and being swapped temporally by subsets of symbols with respect to digital symbols usable for transmission via a first pair
(continued on p.5 of the Certificate of Correction)

UNITED STATES PATENT AND TRADEMARK OFFICE
CERTIFICATE OF CORRECTION

| | | |
|---|---|---|
| PATENT NO. | : 7,460,581 B2 | Page 5 of 10 |
| APPLICATION NO. | : 10/910955 | |
| DATED | : December 2, 2008 | |
| INVENTOR(S) | : Alberto Serratore et al. | |

It is certified that error appears in the above-identified patent and that said Letters Patent is hereby corrected as shown below:

(continuation of p.4 of the Certificate of Correction)
of antennas;
   use, for transmission via the first pair of antennas, a signal obtained by subjecting said organized digital symbols to spreading with a code-division-multiple-access (CDMA) code, to space-time coding, to scrambling with a scrambling code, and to adding with respective pilot flows for channel estimation;
   use, for transmission via the at least one second pair of antennas, a signal obtained by subjecting said swapped temporally set of symbols to spreading with a CDMA code, to space-time coding, to scrambling with a scrambling code, and to adding with respective pilot flows for channel estimation,
   wherein at least one between the CDMA code and the scrambling code usable for transmission via the at least one second pair of antennas is different from the CDMA code and the scrambling code usable for transmission via the first pair of antennas;
   use, in addition to the first pair of antennas, a plurality of second pairs of antennas, sets of symbols usable for transmission via the plurality of second pairs of antennas being swapped temporally by subsets of symbols with respect to the digital symbols used for transmission via the first pair of antennas; and
   use, for transmission via the plurality of second pairs of antennas, signals obtained by subjecting said swapped temporally sets of symbols to spreading with respective CDMA codes, to space-time coding, to scrambling with respective scrambling codes, and to adding with respective pilot flows for channel estimation,
   wherein at least one between the respective CDMA codes and the respective scrambling codes usable for transmission via the plurality of second pairs of antennas is different from the CDMA code and the scrambling code used for transmission via the first pair of antennas. --

Columns 11-12
Lines 61-67 and 1-31 respectively,
"A system for communicating, via a plurality of first antennas and a plurality of second antennas, digital symbols produced according to a modulation scheme, the system comprising: means for organizing digital symbols in sets, at least one set of the sets of symbols being usable for transmission via the second antennas and being swapped temporally by subsets of symbols with respect to digital symbols usable for transmission via the first antennas; means for using, for transmission via the first antennas, a signal obtained by subjecting said organized digital symbols to spreading with a first code, to space-time coding, to scrambling with a scrambling code, and to adding with respective pilot flows for channel estimation; and means for using, for transmission via the second antennas, a signal obtained by subjecting said swapped temporally set of symbols to spreading with a second code, to space-time coding, to scrambling with a scrambling code, and to adding with respective pilot flows for channel estimation; wherein at least
(continued on p.6 of the Certificate of Correction)

UNITED STATES PATENT AND TRADEMARK OFFICE
CERTIFICATE OF CORRECTION

| | |
|---|---|
| PATENT NO. | : 7,460,581 B2 |
| APPLICATION NO. | : 10/910955 |
| DATED | : December 2, 2008 |
| INVENTOR(S) | : Alberto Serratore et al. |

It is certified that error appears in the above-identified patent and that said Letters Patent is hereby corrected as shown below:

(continuation of p.5 of the Certificate of Correction)
one between the second code and the scrambling code usable for transmission via the second antennas is different from the first code and the scrambling code usable for transmission via the first antennas; means for using, in addition to the first antennas, a plurality of second pairs of antennas, sets of symbols usable for transmission via the plurality of second pairs of antennas being swapped temporally by subsets of symbols with respect to the digital symbols used for transmission via the first antennas; and means for using, for transmission via the plurality of second pairs of antennas, signals obtained by subjecting said swapped temporally sets of symbols to spreading with respective code-division-multiple-access (CDMA) codes, to space-time coding, to scrambling with respective scrambling codes, and to adding with respective pilot flows for channel estimation; wherein at least one between the respective CDMA codes and the respective scrambling codes usable for transmission via the plurality of second pairs of antennas is different from the CDMA code and the scrambling code used for transmission via the first antennas."
should read as
-- A system for communicating, via a plurality of first antennas and a plurality of second antennas, digital symbols produced according to a modulation scheme, the system comprising:
   means for organizing digital symbols in sets, at least one set of the sets of symbols being usable for transmission via the second antennas and being swapped temporally by subsets of symbols with respect to digital symbols usable for transmission via the first antennas;
   means for using, for transmission via the first antennas, a signal obtained by subjecting said organized digital symbols to spreading with a first code, to space-time coding, to scrambling with a scrambling code, and to adding with respective pilot flows for channel estimation; and
   means for using, for transmission via the second antennas, a signal obtained by subjecting said swapped temporally set of symbols to spreading with a second code, to space-time coding, to scrambling with a scrambling code, and to adding with respective pilot flows for channel estimation;
   wherein at least one between the second code and the scrambling code usable for transmission via the second antennas is different from the first code and the scrambling code usable for transmission via the first antennas;
   means for using, in addition to the first antennas, a plurality of second pairs of antennas, sets of symbols usable for transmission via the plurality of second pairs of antennas being swapped temporally by subsets of symbols with respect to the digital symbols used for transmission via the first antennas; and
   means for using, for transmission via the plurality of second pairs of antennas, signals obtained by subjecting said swapped temporally sets of symbols to spreading with
(continued on p.7 of the Certificate of Correction)

UNITED STATES PATENT AND TRADEMARK OFFICE
CERTIFICATE OF CORRECTION

PATENT NO. : 7,460,581 B2
APPLICATION NO. : 10/910955
DATED : December 2, 2008
INVENTOR(S) : Alberto Serratore et al.

It is certified that error appears in the above-identified patent and that said Letters Patent is hereby corrected as shown below:

(continuation of p.6 of the Certificate of Correction)
respective code-division-multiple-access (CDMA) codes, to space-time coding, to scrambling with respective scrambling codes, and to adding with respective pilot flows for channel estimation,
   wherein at least one between the respective CDMA codes and the respective scrambling codes usable for transmission via the plurality of second pairs of antennas is different from the CDMA code and the scrambling code used for transmission via the first antennas. --

Columns 12-13
Lines 53-67 and 1-30 respectively,
"An apparatus to transmit, via a plurality of first antennas and a plurality of second antennas, digital symbols produced according to a modulation scheme, the apparatus comprising: a processing module to organize the digital symbols in sets, at least one set of the sets of symbols being usable for transmission via the second antennas and being swapped temporally by subsets of symbols with respect to digital symbols usable for transmission via the first antennas; a first unit coupled to the processing module to generate, for transmission via the first antennas, a signal obtained by subjecting said organized digital symbols to spreading with a first code, to space-time coding, to scrambling with a scrambling code, and to adding with respective pilot flows for channel estimation; and a second unit coupled to the processing module to generate, for transmission via the second antennas, a signal obtained by subjecting said swapped temporally set of symbols to spreading with a second code, to space-time coding, to scrambling with a scrambling code, and to adding with respective pilot flows for channel estimation, wherein at least one between the second code and the scrambling code usable for transmission via the second antennas is different from the first code and the scrambling code usable for transmission via the first antennas;      a third unit coupled to use, in addition to the first antennas, a plurality of second pairs of antennas, sets of symbols usable for transmission via the plurality of second pairs of antennas being swapped temporally by subsets of symbols with respect to the digital symbols used for transmission via the first antennas; and a fourth unit coupled to generate, for transmission via the plurality of second pairs of antennas, signals obtained by subjecting said swapped temporally sets of symbols to spreading with respective code-division-multiple-access (CDMA) codes, to space-time coding, to scrambling with respective scrambling codes, and to adding with respective pilot flows for channel estimation;    wherein at least one between the respective CDMA codes and the respective scrambling codes usable for transmission via the plurality of second pairs of antennas is different from the CDMA code and the scrambling code used for transmission via the first antennas."
should read as (continued on p.8 of the Certificate of Correction)

UNITED STATES PATENT AND TRADEMARK OFFICE
CERTIFICATE OF CORRECTION

| | | |
|---|---|---|
| PATENT NO. | : 7,460,581 B2 | |
| APPLICATION NO. | : 10/910955 | |
| DATED | : December 2, 2008 | |
| INVENTOR(S) | : Alberto Serratore et al. | |

It is certified that error appears in the above-identified patent and that said Letters Patent is hereby corrected as shown below:

(continuation of p.7 of the Certificate of Correction)
-- An apparatus to transmit, via a plurality of first antennas and a plurality of second antennas, digital symbols produced according to a modulation scheme, the apparatus comprising:
 a processing module to organize the digital symbols in sets, at least one set of the sets of symbols being usable for transmission via the second antennas and being swapped temporally by subsets of symbols with respect to digital symbols usable for transmission via the first antennas;
 a first unit coupled to the processing module to generate, for transmission via the first antennas, a signal obtained by subjecting said organized digital symbols to spreading with a first code, to space-time coding, to scrambling with a scrambling code, and to adding with respective pilot flows for channel estimation;
 a second unit coupled to the processing module to generate, for transmission via the second antennas, a signal obtained by subjecting said swapped temporally set of symbols to spreading with a second code, to space-time coding, to scrambling with a scrambling code, and to adding with respective pilot flows for channel estimation,
 wherein at least one between the second code and the scrambling code usable for transmission via the second antennas is different from the first code and the scrambling code usable for transmission via the first antennas;
 a third unit coupled to use, in addition to the first antennas, a plurality of second pairs of antennas, sets of symbols usable for transmission via the plurality of second pairs of antennas being swapped temporally by subsets of symbols with respect to the digital symbols used for transmission via the first antennas; and
 a fourth unit coupled to generate, for transmission via the plurality of second pairs of antennas, signals obtained by subjecting said swapped temporally sets of symbols to spreading with respective code-division-multiple-access (CDMA) codes, to space-time coding, to scrambling with respective scrambling codes, and to adding with respective pilot flows for channel estimation,
 wherein at least one between the respective CDMA codes and the respective scrambling codes usable for transmission via the plurality of second pairs of antennas is different from the CDMA code and the scrambling code used for transmission via the first antennas. --

Columns 13-14
Lines 37-50 and 1-28 respectively,
"A system in which digital symbols are communicated, the system comprising: at least one reception antenna to receive signals having the digital symbols, the digital symbols being transmitted via a first transmission antennas and second transmission antennas and being organized in sets, at least one set of the sets of symbols that is used for transmission via the second transmission antennas being swapped temporally by subsets
(continued on p. 9 of the Certificate of Correction)

UNITED STATES PATENT AND TRADEMARK OFFICE
CERTIFICATE OF CORRECTION

PATENT NO. : 7,460,581 B2
APPLICATION NO. : 10/910955
DATED : December 2, 2008
INVENTOR(S) : Alberto Serratore et al.

It is certified that error appears in the above-identified patent and that said Letters Patent is hereby corrected as shown below:

(continuation of p.8 of the Certificate of Correction)
of symbols with respect to the digital symbols used for transmission via the first transmission antennas; wherein for transmission via the first transmission antennas and for transmission via the second transmission antennas, space-time coding is used and at least one between code-division-multiple-access (CDMA) codes and scrambling codes are different; and least one de-spreading device coupled to the at least one reception antenna to substantially eliminate, from the signals received by the at least one reception antenna, said scrambling codes that are different from one another; plurality of second pairs of antennas to receive sets of symbols being swapped temporally by subsets of symbols with respect to the digital symbols used for transmission via the first transmission antennas; and use, for transmission via the plurality of second pairs of antennas, signals obtained by subjecting said swapped temporally sets of symbols to spreading with respective CDMA codes, to space-time coding, to scrambling with respective scrambling codes, and to adding with respective pilot flows for channel estimation; wherein at least one between the respective CDMA codes and the respective scrambling codes usable for transmission via the plurality of second pairs of antennas is different from the CDMA code and the scrambling code used for transmission via said first pair of antennas."
should read as
-- A system in which digital symbols are communicated, the system comprising:
   at least one reception antenna to receive signals having the digital symbols, the digital symbols being transmitted via first transmission antennas and second transmission antennas and being organized in sets, at least one set of the sets of symbols that is used for transmission via the second transmission antennas being swapped temporally by subsets of symbols with respect to the digital symbols used for transmission via the first transmission antennas,
   for transmission via the first transmission antennas and for transmission via the second transmission antennas, space-time coding is used and at least one between code-division-multiple-access (CDMA) codes and scrambling codes are different;
   at least one de-spreading device coupled to the at least one reception antenna to substantially eliminate, from the signals received by the at least one reception antenna, said scrambling codes that are different from one another;
   a plurality of second pairs of antennas to receive sets of symbols being swapped temporally by subsets of symbols with respect to the digital symbols used for transmission via the first transmission antennas; and (continue on p.10 of the Certificate of Correction)

UNITED STATES PATENT AND TRADEMARK OFFICE
CERTIFICATE OF CORRECTION

PATENT NO.         : 7,460,581 B2
APPLICATION NO. : 10/910955
DATED                : December 2, 2008
INVENTOR(S)       : Alberto Serratore et al.

It is certified that error appears in the above-identified patent and that said Letters Patent is hereby corrected as shown below:

(continuation of p.9 of the Certificate of Correction)
 use, for transmission via the plurality of second pairs of antennas, signals obtained by subjecting said swapped temporally sets of symbols to spreading with respective CDMA codes, to space-time coding, to scrambling with respective scrambling codes, and to adding with respective pilot flows for channel estimation,
 wherein at least one between the respective CDMA codes and the respective scrambling codes usable for transmission via the plurality of second pairs of antennas is different from the CDMA code and the scrambling code used for transmission via the first transmission antennas. --

Signed and Sealed this

Second Day of June, 2009

JOHN DOLL
*Acting Director of the United States Patent and Trademark Office*